J. F. MULDOON.
TUBE CONSTRUCTION.
APPLICATION FILED DEC. 13, 1919.

1,400,452.

Patented Dec. 13, 1921.

Inventor,
John F. Muldoon
by
Atty

UNITED STATES PATENT OFFICE.

JOHN F. MULDOON, OF MELROSE, MASSACHUSETTS.

TUBE CONSTRUCTION.

1,400,452. Specification of Letters Patent. Patented Dec. 13, 1921.

Application filed December 13, 1919. Serial No. 344,680.

*To all whom it may concern:*

Be it known that I, JOHN F. MULDOON, a citizen of the United States, residing at Melrose, in the county of Middlesex and State of Massachusetts, have invented an Improvement in Tube Construction, of which the following is a specification.

My invention relates to tube construction and is particularly adapted for inner tubes for pneumatic tires.

The usual inner tube is made entirely of rubber and, in itself, has but little strength, the outer casing of the tire being depended upon for its support. As the outer casing becomes worn, it becomes weaker and, unless care is taken, the tube eventually "blows" through the casing.

The object of my invention is to provide a tube so constructed that it possesses, in itself, sufficient strength to support its load, without material assistance from the outer casing, and yet is flexible, and has both lateral and longitudinal elasticity whereby it may expand to fill the casing, and to adjust itself to variable road conditions.

The tube embodying my invention derives its strength from fabric incorporated in its construction by which it is enabled to resist lateral rupture, and derives its lateral and longitudinal elasticity by the particular arrangement of the fabric therein.

The tube may be initially built up of straight sections of fabric and uncured rubber and may be afterward vulcanized, and the ends are then joined together in accordance with common practice.

The tube-structure comprises an innermost tubular sheath 10 of uncured rubber which is relatively thin, its chief purpose being to serve as a protective covering for the innermost layer of fabric wound thereon.

Figure 1:
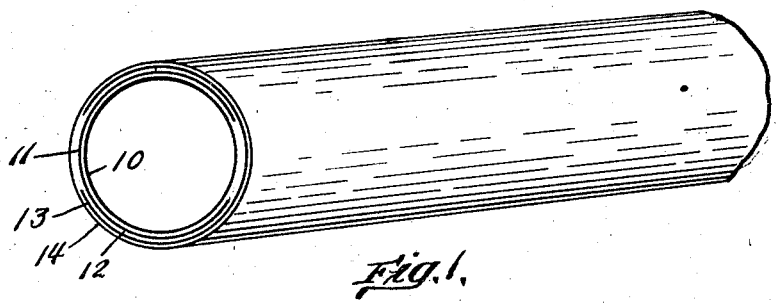
Figure 1 is a perspective view of a section of a tube embodying my invention.
Figure 2:
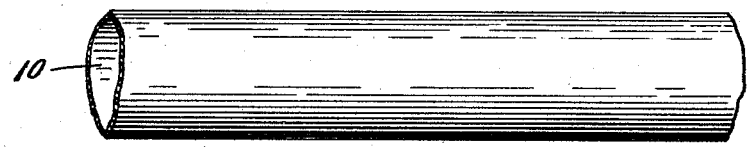
Fig. 2 is a side view of the initial or inner sheath of the tube.
Figure 3:
Fig. 3 is a side view of the sheath of Fig. 2 with the first layer of fabric strip wound thereon.

A layer of fabric, in the form of a strip 11, diagonally cut, is applied over said sheath 10, and it is a feature of the invention that said strip is spirally wound thereon with the convolutions thereof spaced-apart by a substantial distance, as illustrated in Fig. 3. Any suitable fabric, as canvas, duck, and the like may be employed which is cut on a bias or so formed as to admit of the flexing of the tube without kinking, and is suitably prepared for vulcanizing; or the so-called "cord" fabric may be employed.

A second sheet or tube 12 of uncured rubber is applied over said convolutions of fabric, which is relatively thick as compared with the inner sheath 10, and comprises the body structure of the tube structure. Said tube serves to yieldingly unite the innermost fabric layer with an adjacent outer layer and imparts to the completed tube a considerable portion of its elasticity.

A second layer of fabric in the form of a strip 13, is applied over said relatively thick tube 12, and is similar to said first layer in that it is spirally wound, and the convolutions are spaced-apart a substantial distance.

Figure 4:
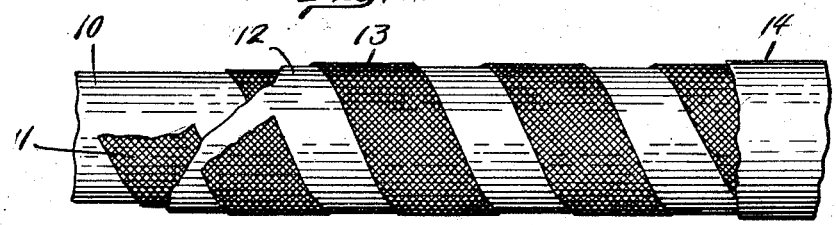
Fig. 4 is a side view of the tube illustrating the first and second layers of fabric strip with the interposed layer or sheath of rubber, and the relative arrangement of the fabric strips.
Figure 5:
Fig. 5 is a longitudinal section through the wall of the completed tube before vulcanizing.

It is a feature of the invention that the two layers of fabric bear a definite relation with each other. The second layer is so applied that its convolutions are wound over the space between the convolutions of the first layer; and the space between the convolutions is designed to be less than the width of the strips whereby the convolutions of one strip overlap the adjacent convolutions of the other strip and there is no portion of the tube that is not protected by a layer of fabric, either the outer or the inner layer. This construction is clearly illustrated in Figs. 4 and 5.

An outer layer 14 of uncured rubber sheet or tube is applied over the second fabric layer; and its prime function is to protect the outer fabric layer from moisture and also from chafing when in use although, obviously it imparts added resiliency and strength to the tube structure. Preferably said outer layer 14 is thicker than the innermost sheath 10, and preferably the intermediate layer 12 is thicker than either of said protective layers 10 and 14.

Figures 6, 7:
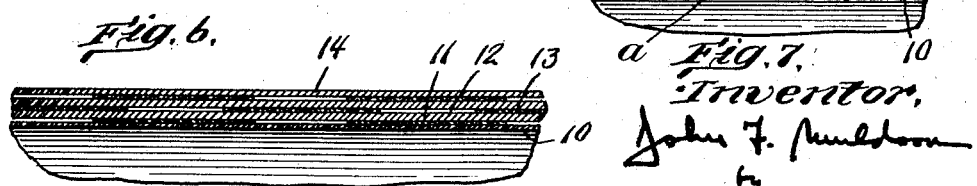
Fig. 6 is a longitudinal section through the wall of a modified tube construction before vulcanizing illustrating the method of building up the tube to obtain greater strength.
Fig. 7 is a sectional view of the tube wall after curing.

The tube structure, constructed as above set forth, is then vulcanized and the various layers of rubber and the layers of fabric become intimately united to form the homogeneous tube structure illustrated in Fig. 7.

While, for many purposes, the construction above described imparts to the tube sufficient strength, yet additional strength may be given the tube by continuing the building up process of alternate layers of rubber and fabric strip with spaced-apart convolutions, with the convolutions of an outer fabric layer disposed over the space between the convolutions of the adjacent inner fabric layer. A tube construction having additional fabric layers so arranged is illustrated in Fig. 6.

The above described construction results in a tube structure that has great lateral strength because every portion of the tube is reinforced by fabric, and has longitudinal and lateral elasticity or stretch, because of the open-spaced convolutions of the fabric layers which are permitted to contract or expand because of the elasticity of the rubber body disposed between and connecting the convolutions of the several fabric layers.

It will be noted that that portion of the vulcanized rubber of the tube structure disposed between the convolutions of one fabric layer, as at $a$, is resilient and will permit the convolutions to move laterally, or the tube to stretch along its length; and that portion, as $b$, disposed between the superimposed convolutions of two adjacent fabric layers is also resilient and will permit the tube to stretch along its length; and the several fabric layers will be united and separated by a resilient rubber body.

I claim:

1. A tube structure comprising an inner spirally-wound fabric layer having spaced-apart convolutions, an outer spirally-wound fabric layer having spaced-apart convolutions disposed over the spaces between and overlapping the convolutions of said inner layer, and a resilient rubber tubular body structure intimately united with said fabric layers and separating and yieldingly uniting both fabric layers and also yieldingly uniting the convolutions of each fabric layer.

2. A tube structure comprising an inner spirally-wound fabric layer having spaced-apart convolutions, an outer spirally-wound fabric layer having spaced-apart convolutions disposed over the spaces between and overlapping the convolutions of said inner layer, and a resilient tubular body structure intimately united with said fabric layers and separating and yieldingly uniting both fabric layers and also yieldingly uniting the convolutions of each fabric layer and filling the spaces between the convolutions of each fabric layer and completely inclosing said fabric layers.

In testimony whereof, I have signed my name to this specification.

JOHN F. MULDOON.

Witness:
H. B. DAVIS.